US012638215B2

(12) United States Patent  
Vincent et al.

(10) Patent No.: US 12,638,215 B2  
(45) Date of Patent: May 26, 2026

(54) SYSTEM AND METHOD FOR SCALE MANAGEMENT IN WATER HEATING SYSTEM

(71) Applicant: Bradford White Corporation, Ambler, PA (US)

(72) Inventors: Jonathan Vincent, Middleville, MI (US); Nicholas Wandrie, Middleville, MI (US); Chad VanderRoest, Middleville, MI (US)

(73) Assignee: Bradford White Corporation, Ambler, PA (US)

( * ) Notice: Subject to any disclaimer, the term of this patent is extended or adjusted under 35 U.S.C. 154(b) by 475 days.

(21) Appl. No.: 18/224,649

(22) Filed: Jul. 21, 2023

(65) Prior Publication Data

US 2024/0027101 A1     Jan. 25, 2024

Related U.S. Application Data

(60) Provisional application No. 63/391,505, filed on Jul. 22, 2022.

(51) Int. Cl.

| | |
|---|---|
| *F24H 9/40* | (2022.01) |
| *C02F 1/00* | (2023.01) |

(Continued)

(52) U.S. Cl.  
CPC .............. *F24H 9/40* (2022.01); *C02F 1/001* (2013.01); *F24D 19/0092* (2013.01); *F24H 1/10* (2013.01);

(Continued)

(58) Field of Classification Search  
CPC .......... F24H 9/40; F24D 19/0092; C02F 5/08; C02F 1/001; C02F 2303/22; B01D 29/01; B01D 29/03; B01D 29/05  
See application file for complete search history.

(56) References Cited

U.S. PATENT DOCUMENTS

| | | | |
|---|---|---|---|
| 7,001,524 B2 | 2/2006 | Moore | |
| 7,097,765 B1 | 8/2006 | Jackiw et al. | |

(Continued)

FOREIGN PATENT DOCUMENTS

| | | |
|---|---|---|
| CA | 2834542 C | 1/2016 |
| CN | 106861268 A | 6/2017 |

(Continued)

OTHER PUBLICATIONS

International Search Report and Written Opinion for International Application No. PCT/US2023/028320, mailed Sep. 21, 2023, 16 pages.

*Primary Examiner* — Ko-Wei Lin  
(74) *Attorney, Agent, or Firm* — Willard Quinn PLLC

(57) ABSTRACT

In one example, a system for collecting scale from water in a water heating appliance includes a reservoir having an interior, an inlet through which the water flows into the interior, and an outlet through which the water flows from the interior, the inlet, the outlet, and the interior defining a water pathway. A filter is positioned within the interior of the reservoir and the filter is oriented to traverse the water pathway and divide the interior of the reservoir into an upstream section into which the water flows from the inlet and a downstream section from which the water flows to the outlet. A collection chamber is configured to receive scale as the water flows along the water pathway through the interior of the reservoir and the water passes through the filter. The collection chamber is positioned in or adjacent the upstream section of the interior of the reservoir.

24 Claims, 4 Drawing Sheets

(51) Int. Cl.
　　*F24D 19/00*　　　　(2006.01)
　　*F24H 1/10*　　　　(2022.01)

(52) U.S. Cl.
　　CPC ...... *C02F 2303/22* (2013.01); *C02F 2303/24*
　　　　　　　　　　　　　　　　　(2013.01)

(56)　　　　　References Cited

U.S. PATENT DOCUMENTS

| | | | |
|---|---|---|---|
| 7,387,721 | B2 | 6/2008 | Moore |
| 8,152,995 | B2 | 4/2012 | Moore |
| 8,221,618 | B2 | 7/2012 | Murray et al. |
| 8,465,572 | B1 | 6/2013 | Ball, IV et al. |
| 9,149,740 | B2 | 10/2015 | Downie |
| 10,197,293 | B2 | 2/2019 | Kawashima et al. |
| 10,619,887 | B2 | 4/2020 | Sugatani et al. |
| 2006/0006114 | A1* | 1/2006 | Deskins ................ B01D 21/02 |
| | | | 210/793 |
| 2008/0006227 | A1* | 1/2008 | Ziehm ................ F24D 17/0078 |
| | | | 392/465 |

| | | | |
|---|---|---|---|
| 2009/0000573 | A1 | 1/2009 | McClellan |
| 2014/0042075 | A1* | 2/2014 | Ding ...................... C02F 5/145 |
| | | | 210/284 |
| 2016/0151724 | A1* | 6/2016 | Jeong ...................... C02F 1/505 |
| | | | 210/295 |
| 2019/0177184 | A1* | 6/2019 | Averbeck ............... B02C 19/00 |
| 2019/0195841 | A1* | 6/2019 | Bai ........................ B01D 15/22 |
| 2019/0270651 | A1 | 9/2019 | Zhan et al. |
| 2022/0034522 | A1 | 2/2022 | Ogan et al. |

FOREIGN PATENT DOCUMENTS

| | | | | |
|---|---|---|---|---|
| DE | 19717869 | A1 * | 12/1997 | ......... B01D 21/0009 |
| EP | 2796806 | A1 | 10/2014 | |
| EP | 3372291 | A1 | 9/2018 | |
| EP | 3845287 | A1 | 7/2021 | |
| WO | 2021062239 | A1 | 4/2021 | |
| WO | 2021090758 | A1 | 5/2021 | |
| WO | 2021136762 | A1 | 7/2021 | |

* cited by examiner

SYSTEM AND METHOD FOR SCALE MANAGEMENT IN WATER HEATING SYSTEM

CROSS-REFERENCE TO RELATED APPLICATIONS

This application claims priority from U.S. Provisional Application Ser. No. 63/391,505, titled "System and Method for Scale Management in Water Heating System," filed Jul. 22, 2022, the entirety of which is incorporated herein by reference for all purposes.

FIELD OF THE INVENTION

The disclosed subject matter relates generally to scale management of water in a water heating system, and more particularly, to scale management of water in water heating appliances, such as tankless water heaters.

BACKGROUND OF THE INVENTION

Conventionally, various components of a water system, such as a water heating system or water distribution system, may require maintenance, repair, or replacement over time, in order to ensure proper operation and/or avoid safety hazards. For example, scale build up from undesirable mineral deposits and other contaminants (scaling) may develop in the fluid-contacting surfaces of one or more components of the water system. Excessive scale builds up from escaped scale, or other like issues, can affect service life and efficiency of components or devices downstream from the water heating system, e.g. due to clogging from scale. Thus, there remains a need for improvements in scale management of water flowing from tankless water heating appliances, in terms of at least one of service life, efficiency, cost, ease of serviceability, and manufacturability.

SUMMARY OF THE INVENTION

The subject matter disclosed herein is directed to scale collection or management of water heating systems and/or water heating appliances.

In one example, a system for collecting scale from water in a water heating appliance includes a reservoir having an interior, an inlet through which the water flows into the interior, and an outlet through which the water flows from the interior, the inlet, the outlet, and the interior defining a water pathway. A filter is positioned within the interior of the reservoir and the filter is oriented to traverse the water pathway and divide the interior of the reservoir into an upstream section into which the water flows from the inlet and a downstream section from which the water flows to the outlet. A collection chamber is configured to receive scale as the water flows along the water pathway through the interior of the reservoir and the water passes through the filter. The collection chamber is positioned adjacent the upstream section of the interior of the reservoir.

In another aspect of the invention, a tankless water heater is provided comprising the system for collecting scale from water, together with a conduit coupled to the system through which the water flows, and a heat source positioned to transfer heat to the water in the conduit. The water flows through the inlet and into the interior of the reservoir from an upstream portion of the conduit, and the water flows through the outlet from the interior into a downstream portion of the conduit.

In yet another aspect of the invention, a method is provided for collecting scale from water in a water heating appliance. The method includes flowing the water along a pathway into an interior of a reservoir through an inlet, through the interior of the reservoir, and out from the interior of the reservoir through an outlet. It also includes passing the water across a filter positioned within the interior of the reservoir, traversing the water pathway, and dividing the interior of the reservoir into an upstream section into which the water flows from the inlet and a downstream section from which the water flows to the outlet. Scale is collected in a collection chamber adjacent or in the upstream section of the interior of the reservoir as the water flows along the water pathway through the interior of the reservoir and the water passes through the filter.

BRIEF DESCRIPTION OF THE DRAWINGS

The following detailed description is best understood when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale unless otherwise indicated. On the contrary, the dimensions of the various features may be expanded or reduced for clarity. Included in the drawings are the following figures.

DETAILED DESCRIPTION OF THE INVENTION

Aspects of the disclosed subject matter relate to a system for collecting or managing scale from water in a water heating appliance, such as a water heater, a boiler, or the like. The disclosed system may provide improvements in service life and efficiency of downstream system components or devices and response time to temperature demand. Such improvements may be created, for example, control of water flow velocity from a heat exchanger and through a reservoir, or improvements in the cost and/or resources associated with operating and/or repairing downstream devices in a water heating system due to scale build up.

The subject matter disclosed herein is described primarily with respect to water heaters and water heating systems. However, it will be understood that the scope of this disclosure is not so limited. The subject matter of this disclosure is applicable to a water heating or distribution system including any type or variety of heat exchanger, including any heat exchanger designed to exchange heat between fluids (liquid or gas), particularly fluids with a potential for fowling, including but not limited to fluid containing calcium, iron, manganese, or other elements associated with fowling. In particular, this disclosure is not limited to devices for heating water (i.e. $H_2O$). As used herein, the terms "water heating appliance," "water heating system," and "water heating" are intended to encompass any system, device, or method adapted to generate and maintain a source of heated fluid.

The subject matter disclosed herein is described primarily with respect to a scale collection chamber, filter, inlet, and/or outlet that may each be manufactured as integral or unitary parts of compartments or tubes of a water heater system, e.g. a reservoir, a flue tube, or a heat exchanger. However, it will be understood that the scope of this disclosure is not so limited. The disclosed scale collection chamber, filter, inlet, and/or outlet may each be formed as a separate part, which may be installed into existing compartments or tubes of a water heating system, e.g. a reservoir, a flue tube, or a heat exchanger. The integral scale collection chamber, filter, inlet, and/or outlet may provide particular advantages with respect to ease of manufacture and installation.

Figure 1:
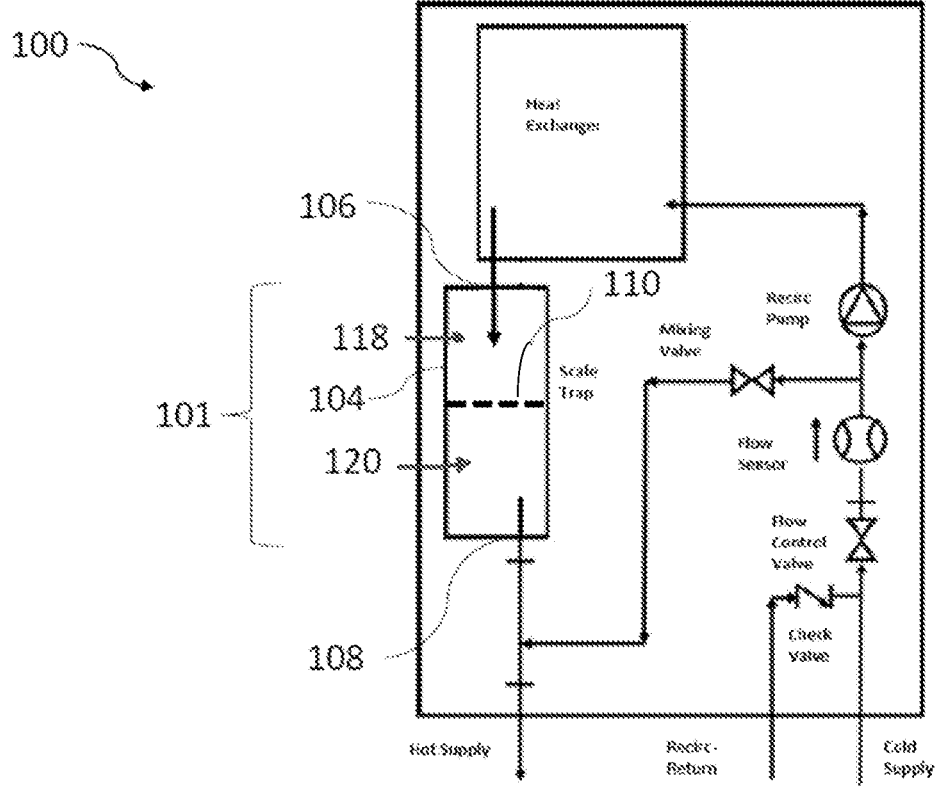
FIG. 1 depicts schematically an exemplary water heating appliance, such as a tankless water heater, including a system for collecting scale from water, according to an embodiment.

Referring now to the drawings, FIG. 1 is a schematic block diagram that illustrates an example of a water heating appliance 100 that includes a system 101 for collecting scale from water in the water heating appliance 100. The water heating appliance 100 includes a conduit (generally indicated schematically by lines in FIG. 1) coupled to the system 101 through which the water flows. A heat source such as a heat exchanger is positioned to transfer heat to the water in the conduit. The water flows through an inlet 106 and into the interior of a reservoir 104 from an upstream portion of the conduit, and the water flows through an outlet 108 from the interior into a downstream portion of the conduit. The water heating appliance 100 is optionally a tankless water heater but may be any form of appliance configured to heat water, including without limitation a storage water heater.

Figure 2:
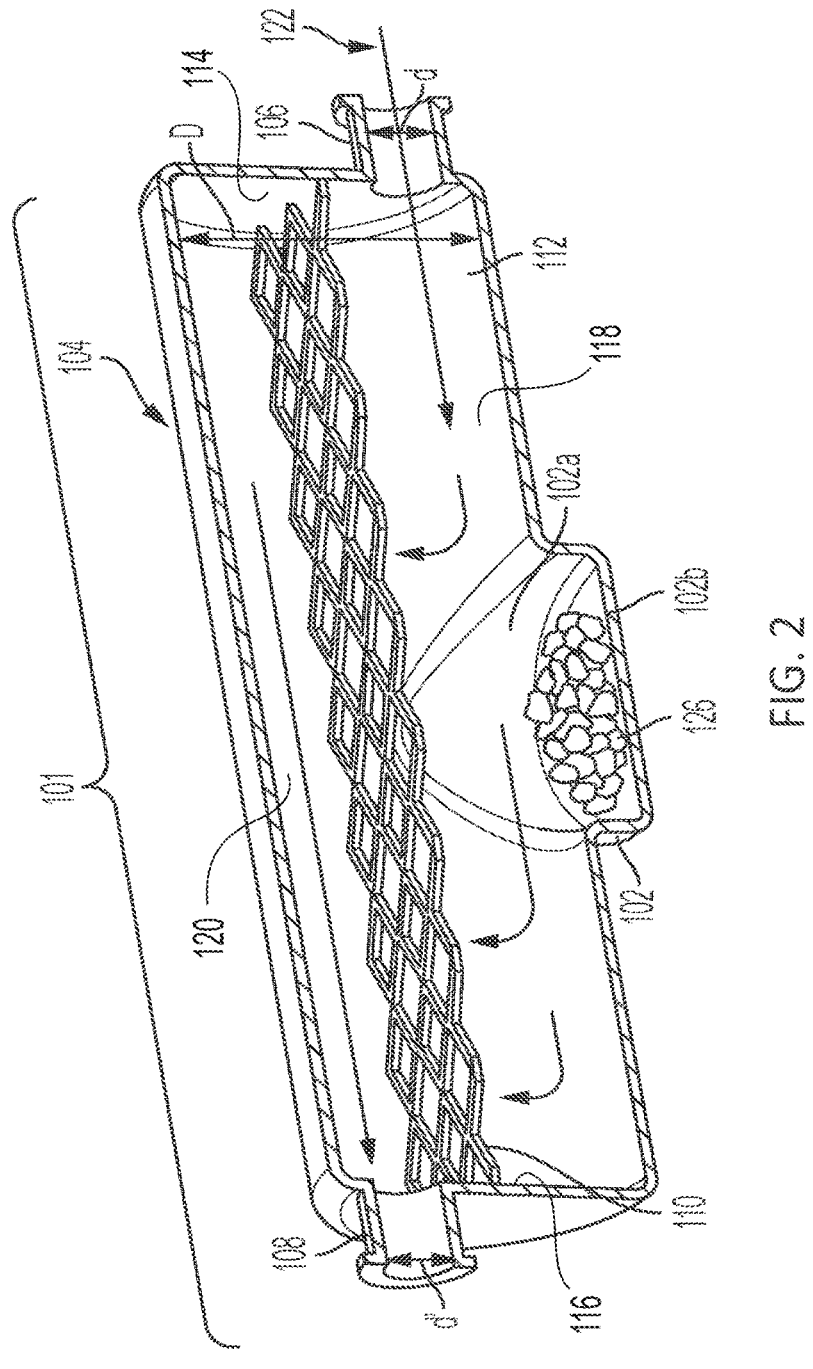
FIG. 2 depicts a cross-sectional view of a reservoir showing an exemplary water pathway.

FIG. 2 illustrates an example system 101 for collecting scale from water flowing from a water heating appliance. Scale collection chamber 102 is configured to increase service life and efficiency of components or devices downstream of the reservoir 104, e.g. heat exchangers, sinks, showers, drains, pumps, faucets, etc., by facilitating removal and/or mitigation of excessive scale deposits in the fluid-contacting surfaces of a reservoir 104. In particular, the scale collection chamber 102 collects or traps scale, which escaped other heat exchangers upstream of reservoir 104, within the reservoir 104, thereby preventing clogging of downstream devices. As a general overview, system 101 has the reservoir 104 having an inlet 106 and an outlet 108, and a filter 110. Additional details of system 101 are described below.

Figure 3:
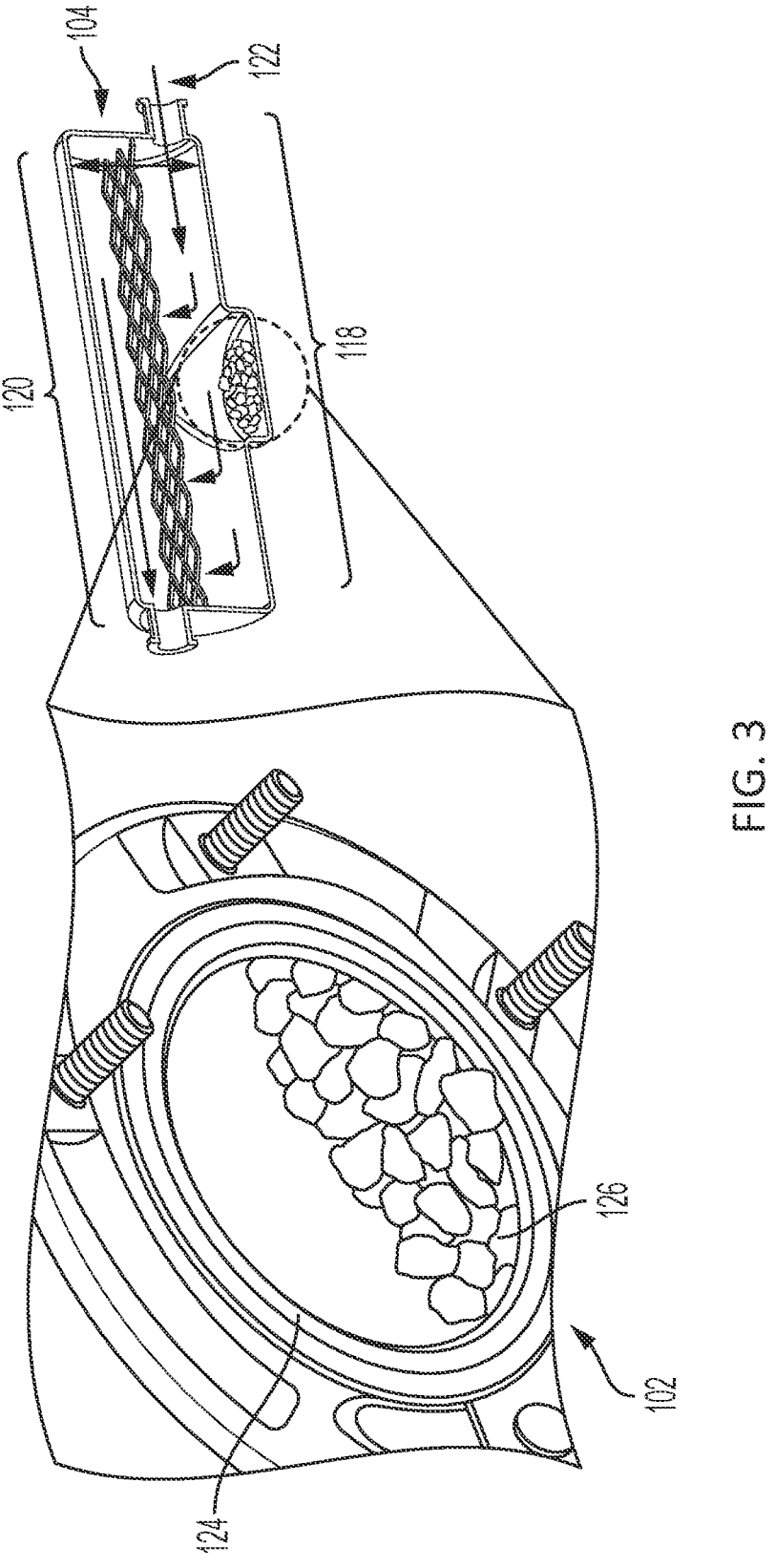
FIG. 3 depicts a detailed view of the exemplary scale collection chamber of FIG. 1.

As illustrated in FIG. 2, the reservoir 104 includes an interior 112 having an internal volume. A fluid-contacting surface of interior 112 may be substantially smooth. Alternatively, some or all of the fluid-contacting surface of interior 112 may be serrated, as desired, i.e. to provide attachment points for filter 110 (discussed further below). Serrations may be formed as small aberrations, projections, points, undulations, protrusions, contours, or other deviations from a flat or planar surface on interior 112. The reservoir generally has a cylindrical shape, as shown in FIGS. 2 and 3, extending for a length between a first end 114 and a second end 116 opposite the first end 114. However, one skilled in the art would understand from the description herein that reservoir 104 may have a size and shape dependent on the size and shape of the water heating appliance (or components thereof) for which reservoir 104 is intended. For example, reservoir 104 may have any shape selected based on the desired manufacturing process or desired shape or size of the scale collection chamber 102, for example.

The reservoir 104 further includes the inlet 106 through which the water flows into the interior 112 of the reservoir 104 and the outlet 108 through which the water flows from the interior 112. In an exemplary embodiment, as shown in FIGS. 2 and 3, the interior 112, inlet 106, and outlet 108 define a water pathway 122 for the flow of water. The inlet 106 is positioned on the first end 114 of the reservoir 104 for the flow of water into the interior 112 of the reservoir 104. The outlet 108 is positioned on the second end 116 of the reservoir 104 for the flow of water from the interior 112 of the reservoir 104.

As shown in FIG. 3, the inlet 106 and outlet 108 may each have a size and shape dependent on the size of the interior 112. Inlet 106 is generally cylindrical, having a radius (r) and a diameter (d=2r). Similarly, outlet 108 is generally cylindrical, having a radius (r') and a diameter (d'=2r'). In one example, radius (r) may have equivalent dimensions as radius (r'). As stated above, reservoir 104 is also generally cylindrical, having a radius (R) and diameter (D=2R). In an exemplary embodiment, as shown in FIG. 3, R>r and R>r'. One skilled in the art would understand from the description herein that the flow velocity of water is inversely proportional to the cross-sectional area of the inlet 106, outlet 108, and interior 112. In other words, water flows at a higher flow velocity through the inlet 106 and outlet 108 relative to a flow velocity through reservoir 104, when R>r and R>r'.

System 101 further includes a filter 110. Filter 110 may have a size and shape dependent on the size and shape of the interior 112 for which filter 110 is intended. Filter 110 is sized and dimensioned to contact fluid-contacting surface of reservoir 104 when filter 110 is inserted (and secured) within reservoir 104. Filter 110 may have a generally flat or planar shape and the filter 110 extends along the length of at least the interior 112 of the reservoir 104, as shown in FIG. 2. Alternatively, filter 110 may have any shape selected based on the desired manufacturing process or desired filtering capabilities of filter 110.

In an exemplary embodiment, filter 110 comprises a screen or strainer or baffle or perforated surface or other structure through which water can flow. Exemplary filters can be made from a variety of materials, including stainless steel, copper, polymer, among other materials. Specifically, for example, filters can comprise perforated steel, copper mesh, copper plates, or wire mesh. Also, the shapes and sizes of filtration apertures can be varied depending on factors including scale size and shape, expected hardness of the fluid being heated, and/or desired characteristics for clogging mitigation or prevention. Said characteristics may comprise observed or expected rates of clogging of scale collection chamber 102, or observed or desired frequency of servicing to empty or remove collected scale from scale collection chamber 102. For example, the size and shape of scale passing through filter 110 may dictate or influence shape and size of the filtration aperture. In particular, the filtration apertures of filter 110 may be configured to entangle or anchor larger scale flakes while still allowing water to flow around said larger scale flakes. In contrast, the relatively smaller scale flakes will pass through filter 110 and congregate in scale collection chamber 102. Over time, clogging of the filtration apertures by larger scale flakes may affect water distribution, thereby requiring servicing (e.g. emptying) of scale collection chamber 102. In one embodiment, the filter 110 includes a pattern of repeated apertures. These apertures consisting of a diamond shape repeated in a diamond pattern. Notably, when at least the scale collection chamber 102 is serviced, filter 110 remains within reservoir 103 (i.e. filter 110 is not necessarily cleaned, serviced, changed, or disposed of). Rather, filter 110 is intended to facilitate the settling or collection of scale in the scale collection chamber 102, which is subsequently emptied.

The filter 110 can be provided in various forms, materials and configurations as described above. Additionally, the filter 110 is preferably configured to encourage the separation and/or precipitation of scale from water flowing through the filter 110, such as by example changing the water flow characteristics, inducing or increasing turbulence, altering water flow patterns, or otherwise impacting the ability of the water flow to retain scale.

Filter 110 is configured to be positioned within the interior 112 of the reservoir 104. Filter 110 may have opposing end portions that are each fixedly coupled to one of the first end 114 and second end 116 of reservoir 104, as shown in FIG. 2. Filter 110 may be fixedly coupled within reservoir 104 by known attachment means. In particular, filter 110 may be positioned within the reservoir 104, such that the filter 110 is oriented to traverse the water pathway 122 (defined by inlet 106, interior 112, and outlet 108) and divide the interior 112 of the reservoir 104 into an upstream section 118 and a downstream section 120 (FIG. 3). The upstream section 118 defines a section within reservoir 104 into which the water flows from the inlet 106. The downstream section 120 defines another section within reservoir 104 from which the water flows to the outlet 108.

System 101 also includes a collection chamber 102. Collection chamber 102 is configured to receive scale as the water flows along the water pathway 122 through the interior 112 of the reservoir 104. As used throughout the description herein, scale comprises sediment, minerals, or a combination thereof. In operation, water flows from inlet 106 and into the upstream section 118, then water passes through the filter 110 to the downstream section 120, and then flows out of the interior 112 via the outlet 108. As the water flows within interior 112, such as within the upstream section 118, scale from the unfiltered water falls out of suspension and into the collection chamber 102.

In one embodiment, collection chamber 102 comprises a receiving portion 102a and a removal portion 102b. The receiving portion 102a may be adapted for receiving scale and the removal portion 102b is adjacent the receiving portion 102a and is the place from which collected scale may be removed. In an embodiment, the upstream section 118 may comprise a portion of scale collection chamber 102 itself, such that the removal portion 102b is at least partially positioned within interior 112 of reservoir 114, such as within upstream section 118.

In another embodiment, as shown in FIG. 2, scale collection chamber 102 is positioned adjacent the upstream section 118 of the interior 112 of the reservoir 104. In this way, the filter 110 and collection chamber 102 may be positioned within the interior 112, such that the water pathway 122 comprises unfiltered water entering the reservoir 104 via the inlet 106 and filtered water exiting the reservoir 104 via the outlet 108. This is achieved based on the relationship between flow velocity of water and cross-sectional area of the one or more structures defining the water pathway 122, as described above. Namely, water flows at a slower flow velocity when the water passes through the interior 112, where filter 110 is positioned. As the water flows at a slower velocity within interior 112, such as within the upstream section 118, scale from the unfiltered water falls out of suspension and into the collection chamber 102. Thus, the total scale entering the reservoir 104 is divided into trapped scale entering the collection chamber 102 and escaped scale exiting the reservoir 104 with the filtered water. In an exemplary embodiment, the ratio of the trapped scale to the total scale is at least 90%, more preferably at least 95%, and the ratio of the escaped scale to the total scale is less than 10%, more preferably less than 5%.

Figure 4:
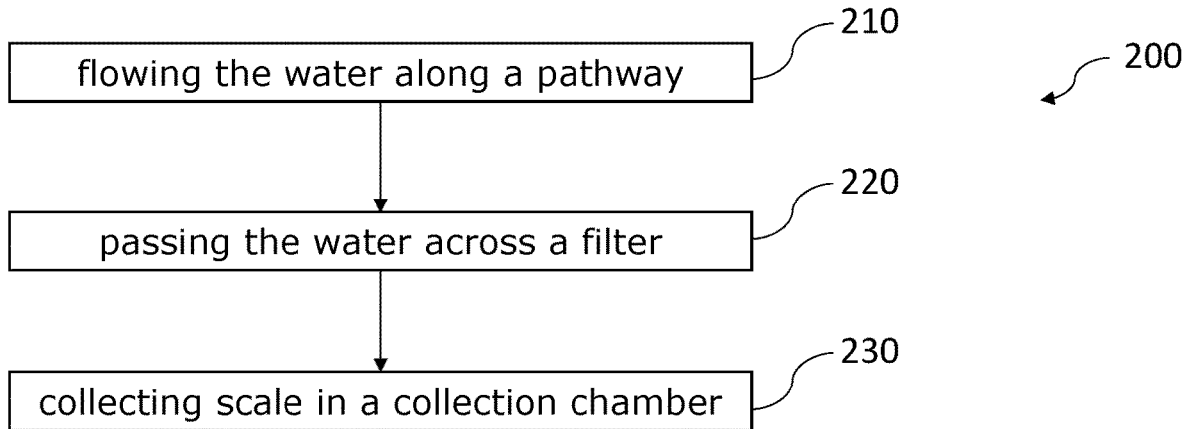
FIG. 4 depicts an exemplary method for collecting scale from water in a water heating appliance, according to an embodiment.

A method 200 for collecting scale from water in a water heating appliance is provided in FIG. 4. The method 200 includes one or more steps including flowing the water along a pathway; passing the water across a filter; and collecting scale in a collection chamber. Additional details of method 200 are set forth below.

In step 210, water is flowed along a pathway. In an exemplary embodiment, water is flowed along a pathway, such as water pathway 122, into an interior 112 of a reservoir 104 through an inlet 106, through the interior 112 of the reservoir 104, and out from the interior 112 of the reservoir 104 through an outlet 108.

In step 220, water is passed across a filter. In an exemplary embodiment, water is passed across a filter, such as filter 110, that is positioned within the interior 112 of the reservoir 104. Further, filter 110 traverses the water pathway 122, and divides the interior 112 of the reservoir 104 into an upstream section 118 into which the water flows from the inlet 106 and a downstream section 120 from which the water flows to the outlet 108. Additionally or optionally, step 220 includes passing the water across a screen or a strainer or a baffle.

In step 230, scale is collected in a collection chamber. In an exemplary embodiment, scale is collected in a collection chamber, such as scale collection chamber 102, as the water flows along the water pathway 122 through the interior 112 of the reservoir 104 and the water passes through the filter 110. Additionally or optionally, the collection chamber 102 comprises a receiving portion 102a for receiving scale and a removal portion 102b from which collected scale is removed. The removal portion 102b of the collection chamber 102 may be positioned adjacent the upstream section 118 of the interior 112 of the reservoir 104. Further, the removal portion 102b of the collection chamber 102 is at least partially positioned within the upstream section 118 of the reservoir 104.

Additionally or optionally, method 200 may comprise step 240 of maintaining a reservoir velocity of the water in the interior of the reservoir. In an exemplary embodiment, step 240 comprises maintaining a reservoir velocity of the water in the interior 112 of the reservoir 104 to be lower than an inlet velocity of the water in the inlet 106, thereby promoting settling of scale from the water into the collection chamber 102.

Additionally or optionally, method 200 may comprise step 250 of dividing the total scale in unfiltered water entering the reservoir. In an exemplary embodiment, step 250 comprises dividing the total scale in unfiltered water entering the reservoir 104, into trapped scale entering the collection chamber 102 and escaped scale exiting the reservoir 104 with the filtered water. Additionally or optionally, step 200 may further comprise maintaining a ratio of the trapped scale to the total scale at least 90%, and the ratio of the escaped scale to the total scale at less than 10%. In an exemplary embodiment, a ratio of the trapped scale to the total scale is maintained at least 95%, and the ratio of the escaped scale to the total scale at less than 5%.

Additionally or optionally, method 200 may comprise step 260 of removing the scale collected in the collection chamber from the reservoir. To facilitate removal of the trapped scale, the trapped scale collected in the collection chamber 102 is removeable from the reservoir 104. Removal of the trapped scale can mitigate or avoid disadvantages related to scale build up, such as clogging, or other like issues, which might affect service life and efficiency of components or devices downstream of the reservoir 104. Additionally or optionally, collection chamber 102 defines an access opening 124 for selectively permitting access to the collection chamber 102 and restricting access to the collection chamber 102. This access opening 124 can mitigate or prevent costs or difficulties associated with maintenance or repair of reservoir 104, due to excessive scale build up.

FIG. 4 depicts an example method comprising steps that are performed sequentially in the order recited. However, it should be understood from the description herein that one or more steps may be omitted and/or performed out of the described sequence of the process while still achieving the desired result.

In use, the system for collecting scale from water in a water heating appliance is operated according to the following steps in any order: flowing the water along a pathway into an interior of a reservoir through an inlet, through the interior of the reservoir, and out from the interior of the reservoir through an outlet; passing the water across a filter positioned within the interior of the reservoir, traversing the water pathway, and dividing the interior of the reservoir into an upstream section into which the water flows from the inlet and a downstream section from which the water flows to the outlet; and collecting scale in a collection chamber adjacent the upstream section of the interior of the reservoir as the water flows along the water pathway through the interior of the reservoir and the water passes through the filter.

Use of the system can also include maintaining a reservoir velocity of the water in the interior of the reservoir lower than an inlet velocity of the water in the inlet. In that way, the system is promoting settling of scale from the water into the collection chamber. The use to the system can also include passing the water across a screen or a strainer or a baffle.

The use of the system can also include dividing the total scale in unfiltered water entering the reservoir into trapped scale remaining in the collection chamber and escaped scale exiting the reservoir with the filtered water. Use of the system can also include maintaining a ratio of the trapped scale to the total scale at least 90% or 95%, and the ratio of the escaped scale to the total scale at less than 10% or 5%. The use of the system can also include removing the scale collected in the collection chamber from the reservoir.

Although the invention is illustrated and described herein with reference to specific embodiments, the invention is not intended to be limited to the details shown. Rather, various modifications may be made in the details within the scope and range of equivalents of the claims, and any combination of any features of any of the embodiments herein may be made, without departing from the invention.

What is claimed:

1. A system for collecting scale from water in a water heating appliance, the system comprising:
   a reservoir having an interior, an inlet through which the water flows into the interior, and an outlet through which the water flows from the interior, wherein the inlet, the outlet, and the interior define a water pathway, and wherein the interior of the reservoir has a length that extends from a first end of the reservoir that the inlet is positioned on to a second end of the reservoir that the outlet is positioned on;
   a filter positioned within the interior of the reservoir, the filter being oriented to traverse the water pathway and divide the interior of the reservoir into an upstream section into which the water flows from the inlet and a downstream section from which the water flows to the outlet, wherein the filter extends along the entirety of the length of the interior of the reservoir; and
   a collection chamber configured to receive scale as the water flows along the water pathway through the interior of the reservoir and the water passes through the filter, the collection chamber comprising a receiving portion for receiving scale and a removal portion from which collected scale is removed.

2. The system of claim 1, wherein the removal portion of the collection chamber is positioned adjacent the upstream section of the interior of the reservoir.

3. The system of claim 1, wherein the removal portion of the collection chamber is at least partially positioned within the upstream section of the reservoir.

4. The system of claim 1, wherein the inlet has an inlet cross-sectional area, the outlet has an outlet cross-sectional area, and the interior of the reservoir has an interior cross-sectional area, the interior cross-sectional area being greater than at least one of the inlet cross-sectional area and the outlet cross-sectional area, and a reservoir velocity of the water in the interior of the reservoir is lower than an inlet velocity of the water in the inlet, such that scale settles from the water into the collection chamber.

5. The system of claim 1, wherein the filter comprises a screen or a strainer or baffle.

6. The system of claim 1, wherein the filter divides the interior of the reservoir into the upstream section and the downstream section.

7. The system of claim 6, wherein the collection chamber is positioned upstream of the filter.

8. The system of claim 1, wherein the water pathway accommodates unfiltered water entering the reservoir via the inlet and filtered water exiting the reservoir via the outlet.

9. The system of claim 8, wherein the scale comprises sediment, minerals, or a combination thereof, the scale falling out of suspension and into the collection chamber as the water flows through the reservoir such that the total scale in unfiltered water entering the reservoir is divided into trapped scale entering the collection chamber and escaped scale exiting the reservoir with the filtered water.

10. The system of claim 1, wherein the scale collected in the collection chamber is removeable from the reservoir.

11. The system of claim 1, wherein the collection chamber defines an access opening for selectively permitting access to the collection chamber and restricting access to the collection chamber.

12. The system of claim 1, wherein the removal portion of the collection chamber defines an access opening for selectively permitting access to the collection chamber and restricting access to the collection chamber.

13. A water heating appliance comprising:
   the system of claim 1,
   a conduit coupled to the system through which the water flows; and
   a heat source positioned to transfer heat to the water in the conduit;
   wherein the water flows through the inlet and into the interior of the reservoir from an upstream portion of the conduit, and the water flows through the outlet from the interior into a downstream portion of the conduit.

14. A method for collecting scale from water in a water heating appliance, the method comprising:

flowing the water along a pathway into an interior of a reservoir through an inlet, through the interior of the reservoir, and out from the interior of the reservoir through an outlet;

passing the water across a filter that is positioned within the interior of the reservoir, that extends across a length of the interior of the reservoir from a first end to a second end, that traverses the water pathway, and that divides the interior of the reservoir into an upstream section into which the water flows from the inlet and a downstream section from which the water flows to the outlet; and collecting scale in a collection chamber as the water flows along the water pathway through the interior of the reservoir and the water passes through the filter.

15. The method of claim 14, wherein the collection chamber comprises a receiving portion for receiving scale and a removal portion from which collected scale is removed.

16. The method of claim 15, wherein the removal portion of the collection chamber is positioned adjacent the upstream section of the interior of the reservoir.

17. The method of claim 15, wherein the removal portion of the collection chamber is at least partially positioned within the upstream section of the reservoir.

18. The method of claim 14, further comprising maintaining a reservoir velocity of the water in the interior of the reservoir lower than an inlet velocity of the water in the inlet, thereby promoting settling of scale from the water into the collection chamber.

19. The method of claim 14, the passing step including passing the water across a screen or a strainer or a baffle.

20. The method of claim 14, further comprising dividing the total scale in unfiltered water entering the reservoir into trapped scale entering the collection chamber and escaped scale exiting the reservoir with the filtered water.

21. The method of claim 20, further comprising maintaining a ratio of the trapped scale to the total scale at least 90%, and the ratio of the escaped scale to the total scale at less than 10%.

22. The method of claim 21, further comprising maintaining a ratio of the trapped scale to the total scale at least 95%, and the ratio of the escaped scale to the total scale at less than 5%.

23. The method of claim 14, further comprising removing the scale collected in the collection chamber from the reservoir.

24. The water heating appliance of claim 13, the water heating appliance being a tankless water heater.

\* \* \* \* \*